United States Patent
Dailey et al.

(10) Patent No.: US 10,050,720 B2
(45) Date of Patent: Aug. 14, 2018

(54) DEVICES AND METHODS FOR CONVERTING ELECTROMAGNETIC SIGNALS INTO OPTICAL SIGNALS

(71) Applicant: Vencore Labs, Inc., Basking Ridge, NJ (US)

(72) Inventors: James Dailey, Basking Ridge, NJ (US); Anjali Agarwal, Basking Ridge, NJ (US); Paul Toliver, Basking Ridge, NJ (US); Colin McKinstrie, Basking Ridge, NJ (US); Nicholas Peters, Knoxville, TN (US)

(73) Assignee: Vencore Labs, Inc., Basking Ridge, NJ (US)

( * ) Notice: Subject to any disclaimer, the term of this patent is extended or adjusted under 35 U.S.C. 154(b) by 0 days.

(21) Appl. No.: 15/166,857

(22) Filed: May 27, 2016

(65) Prior Publication Data

US 2017/0214474 A1   Jul. 27, 2017

Related U.S. Application Data

(60) Provisional application No. 62/168,352, filed on May 29, 2015.

(51) Int. Cl.
*H04B 10/80* (2013.01)
*H04B 10/70* (2013.01)
(Continued)

(52) U.S. Cl.
CPC ........... *H04B 10/80* (2013.01); *G02F 1/3534* (2013.01); *G02F 1/3544* (2013.01); *G02F 1/39* (2013.01); *H04B 10/70* (2013.01)

(58) Field of Classification Search
CPC combination set(s) only.
See application file for complete search history.

(56) References Cited

U.S. PATENT DOCUMENTS

| | | | |
|---|---|---|---|
| 2002/0036814 A1* | 3/2002 | Mueller | G02F 1/3534 398/182 |
| 2003/0068114 A1* | 4/2003 | Link | G02F 2/004 385/14 |

(Continued)

OTHER PUBLICATIONS

S. Dhillon, et al, "Terahertz transfer onto a telecom optical carrier," Nature Photonics, vol. 1, p. 411 (2007).

(Continued)

*Primary Examiner* — David Payne
*Assistant Examiner* — Omar S Ismail
(74) *Attorney, Agent, or Firm* — Heslin Rothenberg Farley & Mesiti P.C.

(57) ABSTRACT

Devices and methods for converting an input electromagnetic signal to an output optical signal consisting of dual sidebands with equalized quantum-limited noise figures of about 3 dB are provided. For instance, a device includes an input for receiving the input electromagnetic signal and an output for delivering the output optical signal; and a non-linear material component connected between the input and the output of the device, the non-linear material component having a non-linear electric susceptibility, wherein the non-linear electric susceptibility of the non-linear material component is selected to mix the input signal with an optical pump signal to produce the output optical signal, wherein the output optical signal has sidebands corresponding to the input signal, and amplifying this optical signal in a phase-sensitive amplifier to produce an output optical signal with sidebands having equalized amplitudes and noise figures.

17 Claims, 5 Drawing Sheets

(51) Int. Cl.
*G02F 1/39* (2006.01)
*G02F 1/35* (2006.01)

(56) References Cited

U.S. PATENT DOCUMENTS

| | | | | |
|---|---|---|---|---|
| 2011/0114856 A1* | 5/2011 | Cooke | ............... | G02F 1/353 |
| | | | | 250/492.22 |
| 2012/0120395 A1* | 5/2012 | Hahn | ............... | G01J 3/0286 |
| | | | | 356/326 |
| 2013/0314767 A1* | 11/2013 | Kuo | ............... | G02B 6/02219 |
| | | | | 359/330 |
| 2014/0198375 A1* | 7/2014 | Yang | ............... | H04B 10/50 |
| | | | | 359/330 |

OTHER PUBLICATIONS

D. M. Baney, et. al., "Coherent optical spectrum analyzer," IEEE PTL 14, (2002).
C. V. Bennett and B. H. Kolner, "Principles of parametric temporal imaging—Part I: System configurations," IEEE JQE 36, (2000).

\* cited by examiner

DEVICES AND METHODS FOR CONVERTING ELECTROMAGNETIC SIGNALS INTO OPTICAL SIGNALS

CROSS-REFERENCE TO RELATED APPLICATIONS

This application claims priority to U.S. Provisional Application No. 62/168,352 filed May 29, 2015, entitled, "Devices and Methods for Converting Terahertz Signals into Optical Signals" which is incorporated herein by reference in its entirety.

STATEMENT REGARDING FEDERALLY SPONSORED RESEARCH OR DEVELOPMENT

This invention was made with government support under contract number W31P4Q-13-C-0069 awarded by the U.S. Department of Defense, DARPA Quiness Program. The government has certain rights in the invention.

BACKGROUND

The present invention relates to signal conversion devices and methods, and more particularly to devices and methods for converting electromagnetic signals to optical signals.

TECHNICAL FIELD

Terahertz (THz) radiation is defined to include electromagnetic waves with frequencies of approximately $10^{11}$-$10^{13}$ Hertz. The manipulation of this part of the electromagnetic (EM) spectrum is currently a rich research topic due to inherent advantages in the fields of communications, imaging, and spectroscopy. However, there are no well-established highly-efficient materials or techniques for the generation, detection, amplification and phase-sensitive processing of THz waves.

Conventional techniques for the manipulation of radio frequency (RF) signals in the optical domain cannot be used for THz signals. Conventional RF photonics uses electro-optic (EO) modulator technology to up-convert the RF signals onto optical carriers, though these modulators exhibit rapidly decreasing performance beyond approximately 40 GHz. Furthermore, there is no clear roadmap for implementing high-performance conventional modulators in the high-frequency THz region. Various options for amplification and detection of THz signals are also still being investigated by the research community.

BRIEF SUMMARY

The shortcomings of the prior art are overcome, and additional advantages are provided, through the provision, in one aspect, of a device for converting an input electromagnetic signal to an output optical signal. The device includes an input for receiving the input electromagnetic signal and an output for delivering the output optical signal; a non-linear material component connected between the input and the output of the device, the non-linear material component having a non-linear electric susceptibility, where the non-linear electric susceptibility of the non-linear material component is selected to mix the input electromagnetic signal with an optical pump signal to convert the terahertz signal to an optical signal, where the output optical signal has sidebands corresponding to the input electromagnetic signal, and amplifying this optical signal in a phase-sensitive amplifier to produce an output optical signal with sidebands having equalized amplitudes and noise figures.

In another aspect, a method for converting an input electromagnetic signal to an output optical signal is presented. The method includes mixing the input electromagnetic signal with an optical pump signal using a non-linear material component, the non-linear material component having a non-linear electric susceptibility, to produce the output optical signal with sidebands corresponding to the input electromagnetic signal and amplifying this optical signal in a phase-sensitive amplifier to produce an output optical signal with sidebands having equalized amplitudes and noise figures.

In another aspect of the present invention, the techniques described herein are utilized for frequencies that are not within the THz region. An advantage of certain embodiments of the present invention that the same method that is utilized for converting a THz signal into an output optical signal can be utilized to convert signals with different frequencies.

Additional features and advantages are realized through the techniques of the present invention. Other embodiments and aspects of the invention are described in detail herein and are considered a part of the claimed invention.

BRIEF DESCRIPTION OF THE SEVERAL VIEWS OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Figure 1:
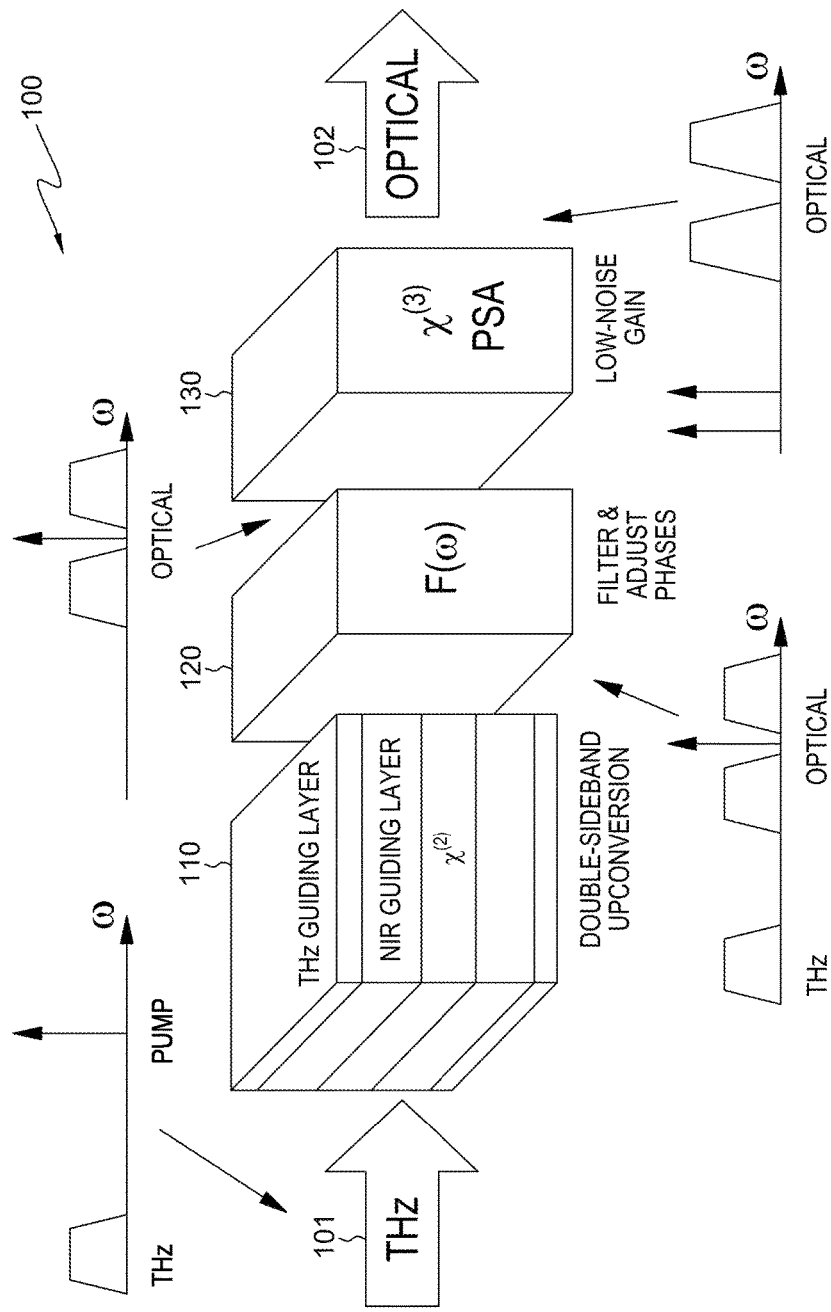
FIG. 1 is a block diagram of a device for converting electromagnetic signals to optical signals, in accordance with one or more aspects of the present invention.

Aspects of the present invention and certain features, advantages, and details thereof, are explained more fully below with reference to the non-limiting examples illustrated in the accompanying drawings. Descriptions of well-known materials, fabrication tools, processing techniques, etc., are omitted so as not to unnecessarily obscure the invention in detail. It should be understood, however, that the detailed description and the specific examples, while indicating aspects of the invention, are given by way of illustration only, and not by way of limitation. Various substitutions, modifications, additions, and/or arrangements, within the spirit and/or scope of the underlying inventive concepts will be apparent to those skilled in the art from this disclosure.

Generally stated, provided herein, in one aspect, is a device for converting an input electromagnetic signal, for example, a signal in the frequency regime of about RF to multi-THz, to an output optical signal. For instance, the device can include an input for receiving the input electromagnetic signal and an output for delivering the output optical signal. In addition, the device can include a non-linear material component connected between the input and the output of the device. Further, the non-linear material component can have a non-linear electric susceptibility, where the non-linear electric susceptibility of the non-linear material component is selected to mix the input signal (e.g., a terahertz signal) with an optical pump signal to produce the output optical signal. The output optical signal can have sidebands corresponding to the input electromagnetic signal.

In one embodiment, the device includes a filter, the filter being connected between the non-linear material component and the output of the device. For example, the filter is configured to filter the input electromagnetic signal and pass the output optical signal to the output of the device.

In another embodiment, the filter can be configured to modify the relative phases of the output optical sidebands and/or pump. In another embodiment, the device can include a phase sensitive amplifier. The phase sensitive amplifier can be configured to amplify the output optical signal. In a further embodiment, the device can include an optical pump capable of generating the optical pump signal.

In another aspect, provided herein is a method for converting an input electromagnetic signal to an output optical signal. For instance, the method includes mixing the input electromagnetic signal with an optical pump signal using a non-linear material component, the non-linear material component having a non-linear electric susceptibility, to produce the output optical signal with sidebands corresponding to the input electromagnetic signal.

In one embodiment, the method further includes filtering signals from the non-linear material component to remove THz signals and pass optical signals. In another embodiment, the method includes modifying the relative phases of the output optical sidebands and/or pump. In a further embodiment, the method includes amplifying the output optical signals, where their phases are aligned for optimum amplification in the phase-sensitive amplifier.

Reference is made below to the drawings, which are not drawn to scale for ease of understanding, wherein the same reference numbers used throughout different figures designate the same or similar components.

FIG. 1 is a block diagram of a device 100 for converting signals comprising an input signals comprising electromagnetic radiation to optical signals, in accordance with one or more aspects of the present invention. FIG. 1 depicts terahertz signals as the input signals being converted to output optical signals in an embodiment of the present invention. However, embodiments of the present invention can be used similarly to convert signals in different parts of the electromagnetic spectrum into optical signals. Thus, the example of this terahertz signal conversion is given as an illustrative example.

In one embodiment, device 100 includes an input 101 for receiving the input electromagnetic signal and an output 102 for delivering the output optical signal; and a non-linear material component 110 connected between input 101 and output 102 of device 100.

For instance, non-linear material component 110 can have a non-linear electric susceptibility, where the non-linear electric susceptibility of non-linear material component 110 is selected to mix the input electromagnetic signal (from input 101) with an optical pump signal to produce the output optical signal (to output 102), where the output optical signal has sidebands corresponding to the input electromagnetic signal.

In another embodiment, device 100 further includes a filter 120. For instance, filter 120 can be connected between non-linear material component 110 and output 102 of device 100. In such a case, filter 120 can be configured to filter the input electromagnetic signal (from input 101) and pass the output optical signal to output 102 of the device. In such a case, for example, filter 120 can be configured to modify the relative phases of the output optical signals.

In a further embodiment, device 100 includes a phase sensitive amplifier 130. For instance, phase sensitive amplifier 130 can be configured to amplify the output optical signal.

In one implementation, the device includes an optical pump capable of generating the optical pump signal.

In another implementation, a chi(2)-enabled non-linear material component 110 can function as a system front-end for device 100 where it receives an optical pump at input 101 (e.g., in the near-infrared (NIR) band) along with an input electromagnetic signal, such as a wide-band THz input signal. In such a case, an optical output signal at output 102, for example a carrier and dual sideband output are contained within the NIR band.

In a further implementation, device 100 can serve as a front-end to a wideband RF spectrum analyzer. For example, an output optical signal on output 102 from device 100 can be optimized for subsequent phase-sensitive processing to enable wideband spectral analysis.

In one example, an output optical signal can be amplified by a chi(3) phase sensitive amplifier 130 in a noise-free manner. In one example, this phase-sensitive amplification enables equalizing the noise-figures and the amplitudes of the output sidebands. In another example, large power gains can also be realized, for example, in silica optical fiber (not shown) connecting at output 102. In a further example, down-conversion back to the THz band can occur.

In another example, device 100 provides enhancements of higher level system aspects such as the amplification and spectral analysis of these signals. In one embodiment, phase-sensitive amplifier 130 enables ultra-low noise processing of the THz signal, and may be used for THz processing.

In a further example, device 100 can support remote imaging applications, e.g., in medicine, allows a first stage of conversion to be carried out in a hand held sensor that includes non-linear material component 110, while a second stage (e.g., including filter 120 and/or phase sensitive amplifier 130) is carried out in a flexible fiber optic, which will simultaneously waveguide and transport the signal to a base unit for further processing and detection. In such a case, an input THz signal can be converted to an output optical signal, which can be transported an arbitrary distance away from input 101 to facilitate detailed processing in another distant area. For example, a centralized analysis system may be located in a remote hospital and connected by optical fiber to output 102.

For instance, the present techniques may be used for communications, imaging, or spectroscopic applications. In addition, the present techniques may be used for military or commercial-grade sensors, and communications and imaging systems. Further, the techniques can be used at large scales, such as earth-to-satellite, or smaller scales such as person-to-person medical applications. In specific examples, the techniques may be used for airport security screening and medical diagnosis.

In addition, specific medical applications can include early diagnosis of a range of ailments from skin cancer to dental cavities. For example, a device for converting terahertz signals to optical signals can enable lower-power THz sources to be used in these imaging applications, reducing system complexity and/or increasing signal-to-noise ratios and subsequent image quality. Further, personal exposure to THz radiation can also be minimized because conversion to optical signals can allow a spatial separation of the terahertz radiation source and a worker performing analysis on the optical signal data. Although THz radiation is generally non-ionizing and considered safe, there may be an impact on DNA.

In one embodiment, the device uses parametric processes for THz up-conversion that utilizes a chi(2) material capable of implementing dual phase-matched processes: difference- and sum-frequency generation. In another embodiment, input to a device with this material is a strong optical pump in the near-infrared (NIR) along with a wideband THz signal which is up-converted to optical frequencies inside the device. In such a case, for example, the output is thus a strong optical carrier along with two sidebands equally spaced from the carrier by the THz signal frequency. By way of example, all output wavelengths can be in the NIR band. In one embodiment, devices or methods disclosed herein uses such a configuration for subsequent ultra-low noise processing of the THz signal in a phase-sensitive parametric amplifier or frequency converter. In addition, the present disclosure provides solutions for phase-sensitive processing of THz signals through optical conversion.

For instance, processing of THz waves can be accomplished using nonlinear parametric processes. In one embodiment, the present disclosure involves generation of dual THz optical sidebands using a chi(2) material. In addition, two parametric processes can be involved, sum-frequency and difference-frequency generation, leading to output the carrier and two sidebands in a way which is optimized for subsequent processing by a chi(3)-based phase-sensitive amplifier or frequency converter. Further, this joint parametric process would be amenable to ultra-wide bandwidth operation.

Figure 2:
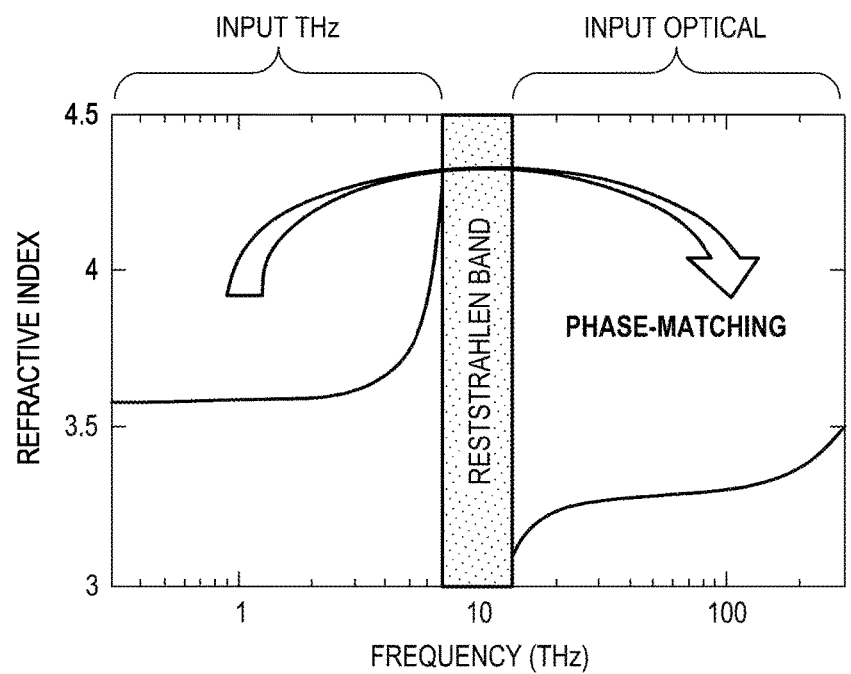
FIG. 2 illustrates phase matching between input optical and terahertz modes, in accordance with one or more aspects of the present invention.

FIG. 2 illustrates phase matching between input optical and terahertz modes, in accordance with one or more aspects of the present invention. In a specific implementation, GaAs has low propagation loss for optical and THz frequencies. For example, Reststrahlen band (optical phonon resonance) provides dispersion enabling bulk phase matching between optical and THz modes.

Figure 3:
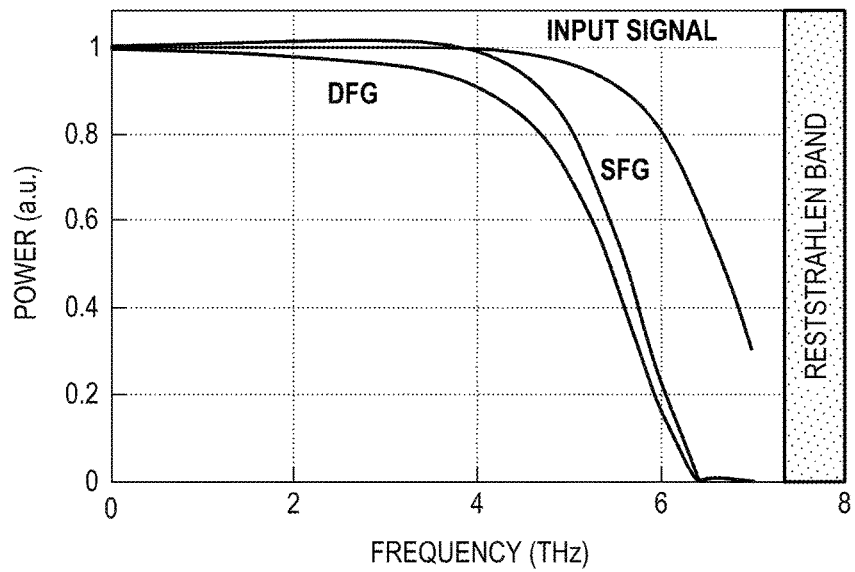
FIG. 3 illustrates conversion bandwidth properties of an input signal, including a THz signal, and an output optical signal, in accordance with one or more aspects of the present invention.

FIG. 3 illustrates conversion bandwidth properties of an input terahertz signal, which as aforementioned is an example of a type of input signal in the range that can be converted by certain embodiments of the present invention, and an output optical signal, in accordance with one or more aspects of the present invention. In one embodiment, rate equation analysis may be used to predict wideband performance using bulk GaAs. For example, input THz signal (blue) has bandwidth approaching Reststrahlen Band. SFG and DFG bands are copies and conjugate-copies of input THZ signal, respectively. This can be an ideal input for subsequent processing by a chi(3)-based phase-sensitive amplifier.

Figure 4A:
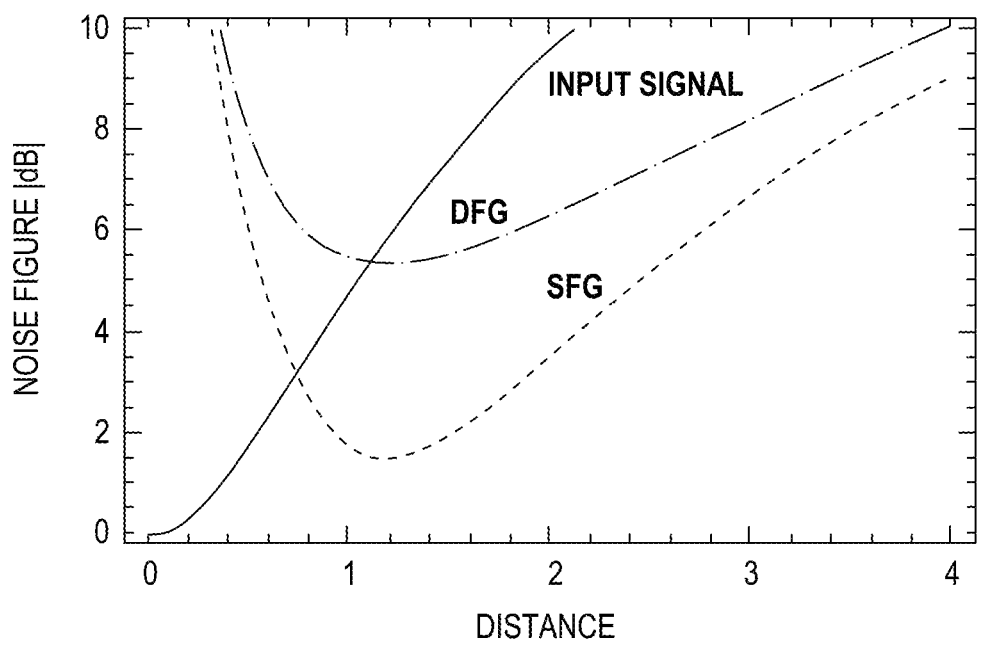
FIGS. 4A-4C illustrate the noise performance, in accordance with one or more aspects of the present invention.
Figure 4B:
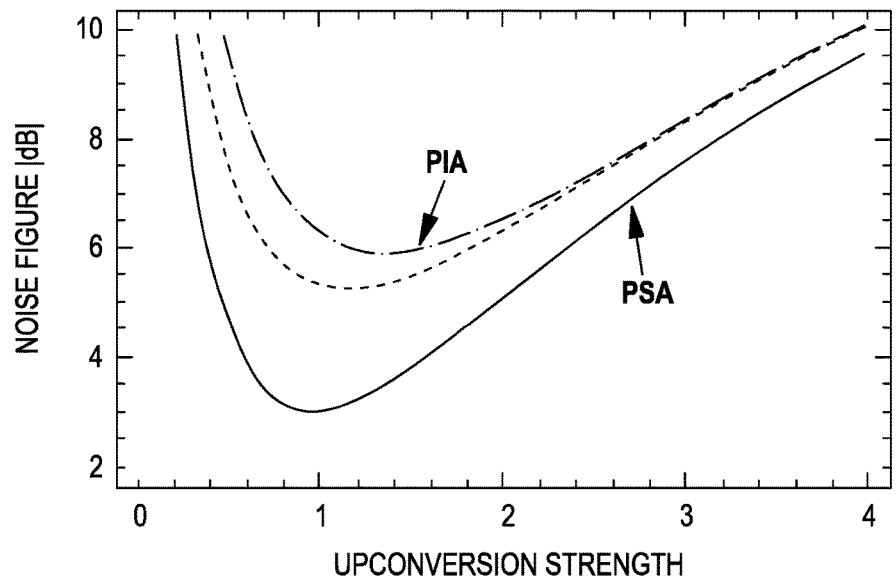
Figure 4B:
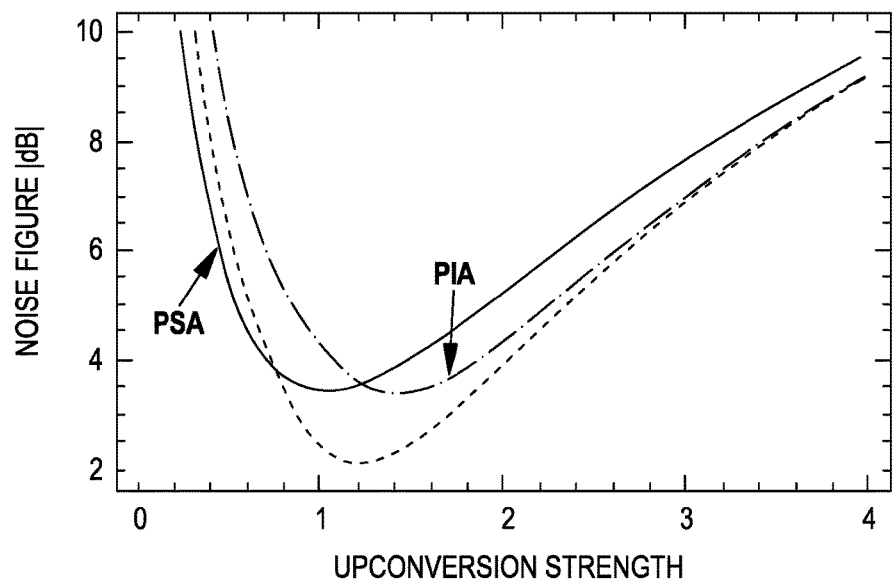
Figure 4C:
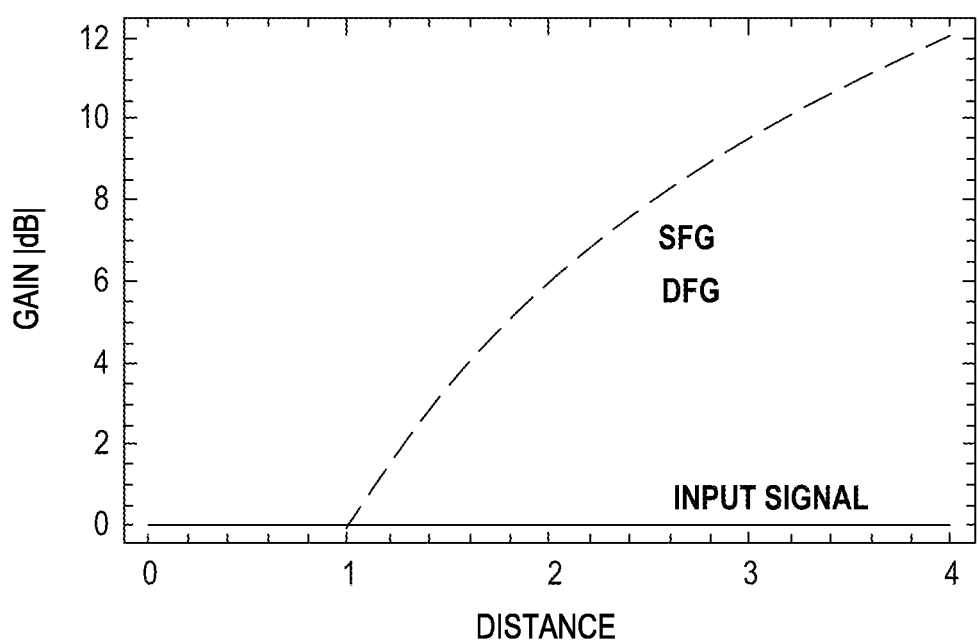

FIGS. 4A-4C illustrate noise and gain performance, in accordance with one or more aspects of the present invention.

By way of explanation, using coupled-mode equations, the noise figures (NF) for the two parametric processes (SFG+DFG) can be calculated. FIG. 4A plots NF vs normalized distance. In one example, at ~1.2 distance units, the two NF are simultaneously minimized to ~2 and 5 dB for SFG and DFG, respectively. If each process operated independently, the NF would be 0 and 3 dB.

FIG. 4B plots NF vs upconversion strength for both sidebands (solid lines). In one example, at ~1 distance unit, the two NF are equalized and simultaneously minimized to ~3 dB for both DFG (top plot) and SFG (bottom plot) idlers when using a PSA. Also, shown in FIG. 4B are the noise figures if a phase-insensitive amplifier (PIA) is employed instead of a PSA (dot-dashed lines). In this case, the noise figure performance for the DFG idler is worse than that obtained with a PSA. FIG. 4C plots gain of the up-conversion process vs normalized distance. For example, at optimal NF performance (>~1 distance unit) there is positive gain for the output idlers.

Embodiments of the present invention also include a method of converting electromagnetic signals to optical signals in accordance with one or more aspect of the present invention. The method includes mixing the input signal with an optical pump signal using a non-linear material component to produce the output optical signal with sidebands corresponding to the input signal. In an embodiment of the present invention, the non-linear material component having a non-linear electric susceptibility. The method also includes filtering signals from the non-linear material component to remove electromagnetic signals and pass optical signals. The method may also include modifying the relative phases of the output optical signal sidebands and/or pump. The method may then include amplifying the output optical signal, wherein the optical signals are phase-aligned for phase-sensitive amplification.

The input signal in this method may include a terahertz signal, aterahertz signal and a radio frequency signal, and/or one or more signals in the frequency regime of approximately radio frequency (RF) to multi-terahertz (THz). The output optical signal may be include (or consist of) dual sidebands with equalized quantum-limited noise figures of about 3 dB.

As understood by one of skill in the art, embodiments of the device described although beneficial when utilized in the THz band, can also be utilized in the radio frequency (RF) bands below 1 THz, thus providing broad frequency coverage. An advantage of embodiments of the present invention is that these embodiments can be utilized to convert a signal into an optical output signal when the incoming signal is in both the RF range and beyond the THz range. Additionally, embodiments of the present invention present an advantage over electronic systems by handling wide fractional bandwidths relative to the carrier. Thus, the capabilities of embodiments of the present invention exceed those of typical electronic circuitry.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements, but is not limited to possessing only those one or more steps or elements. Likewise, a step of a method or an element of a device that "comprises," "has," "includes," or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of one or more aspects of the invention and the practical application, and to enable others of ordinary skill in the art to understand one or more aspects of the invention for various embodiments with various modifications as are suited to the particular use contemplated.

What is claimed is:

1. A device for converting an input electromagnetic signal to an output optical signal, the device comprising:
   an input for receiving the input electromagnetic signal and an output for delivering the output optical signal; and
   a non-linear material component connected between the input and the output of the device, the non-linear material component having a non-linear electric susceptibility, wherein the non-linear electric susceptibility of the non-linear material component is selected to mix the input electromagnetic signal with an optical pump signal to produce the output optical signal, wherein the output optical signal has sidebands corresponding to the input electromagnetic signal; and
   a filter, the filter being connected between the non-linear material component and the output of the device, wherein the filter is configured to filter the input electromagnetic signal and pass the output optical signal to the output of the device.

2. The device of claim 1, wherein the filter is configured to modify the relative phases of the output optical signal sidebands and/or pump.

3. The device of claim 1, further comprising:
   a phase sensitive amplifier, wherein the phase sensitive amplifier is configured to amplify the output optical signal.

4. The device of claim 1, further comprising:
   an optical pump capable of generating the optical pump signal.

5. The device of claim 1, wherein the output optical signal comprises dual sidebands with equalized quantum-limited noise figures of about 3 dB.

6. A method for converting an input signal comprising electromagnetic radiation to an output optical signal, the method comprising:
   receiving, via an input of a device, the input signal;
   mixing the input signal with an optical pump signal using a non-linear material component connected between the input of the device and an output of the device, the non-linear material component having a non-linear electric susceptibility, to produce the output optical signal with sidebands corresponding to the input signal; and
   filtering signals with a filter, the filter being connected between the non-linear material component and the output of the device, from the non-linear material component, the filtering comprising:
   removing electromagnetic signals; and
   passing optical signals to the output of the device.

7. The method of claim 6, wherein the filtering further comprises:
   modifying the relative phases of one or more of the output optical signal sidebands and pump.

8. The method of claim 6, further comprising:
   amplifying, with a phase sensitive amplifier, the output optical signal, wherein the optical signals are phase-aligned for phase-sensitive amplification.

9. The method of claim 6, wherein the input signal comprises a terahertz signal.

10. The method of claim 6, wherein the input signal comprises a terahertz signal and a radio frequency signal.

11. The method of claim 6, wherein the input signal is in the frequency regime of approximately radio frequency (RF) to multi-terahertz (THz).

12. The method of claim 6, wherein the output optical signal comprises dual sidebands with equalized quantum-limited noise figures of about 3 dB.

13. A device for converting an input signal comprising electromagnetic radiation to an output optical signal, the device comprising:
   an input for receiving the input signal and an output for delivering the output optical signal; and
   a non-linear material component connected between the input and the output of the device, the non-linear material component having a non-linear electric susceptibility, wherein the non-linear electric susceptibility of the non-linear material component is selected to mix the input signal with an optical pump signal to produce the output optical signal, wherein the output optical signal has sidebands corresponding to the electromagnetic radiation; and
   a filter, the filter being connected between the non-linear material component and the output of the device, wherein the filter is configured to filter the input signal and pass the output optical signal to the output of the device.

14. The device of claim 13, wherein the filter is configured to modify the relative phases of the output optical signal sidebands and/or pump.

15. The device of claim 13, further comprising:
   a phase sensitive amplifier, wherein the phase sensitive amplifier is configured to amplify the output optical signal.

16. The device of claim 13, further comprising:
   an optical pump capable of generating the optical pump signal.

17. The device of claim 13, wherein the output optical signal comprises dual sidebands with equalized quantum-limited noise figures of about 3 dB.

* * * * *